US012475011B1

(12) United States Patent
Xia et al.

(10) Patent No.: US 12,475,011 B1
(45) Date of Patent: Nov. 18, 2025

(54) HIGH-SPATIAL-ACCURACY ELECTROMAGNETIC FAULT INJECTION METHOD FOR CRYPTOGRAPHIC CHIP

(71) Applicants: CHINA AUTOMOTIVE TECHNOLOGY AND RESEARCH CENTER CO., LTD., Tianjin (CN); CHINA AUTOMOTIVE CHIP (SHENZHEN) TECHNOLOGY CO., LTD., Shenzhen (CN)

(72) Inventors: Xianzhao Xia, Tianjin (CN); Ruiqing Zhai, Tianjin (CN); Yujia Li, Tianjin (CN); Rui Zhao, Tianjin (CN); Mingyang Li, Tianjin (CN); Mingkai Yan, Tianjin (CN); Changqing Dong, Tianjin (CN); Hui Rong, Tianjin (CN); Lixiong Zhang, Tianjin (CN)

(73) Assignees: CHINA AUTOMOTIVE TECHNOLOGY AND RESEARCH CENTER CO., LTD., Tianjin (CN); CHINA AUTOMOTIVE CHIP (SHENZHEN) TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/006,198

(22) Filed: Dec. 30, 2024

(30) Foreign Application Priority Data

Sep. 3, 2024 (CN) .......................... 202411225116.5

(51) Int. Cl.
*G06F 11/26* (2006.01)
*G06F 11/277* (2006.01)

(52) U.S. Cl.
CPC .......... *G06F 11/261* (2013.01); *G06F 11/277* (2013.01)

(58) Field of Classification Search
CPC .............................. G06F 11/261; G06F 11/277
See application file for complete search history.

(56) References Cited

U.S. PATENT DOCUMENTS

2014/0082264 A1\* 3/2014 Wan .................... G06F 11/1012
711/103

FOREIGN PATENT DOCUMENTS

| CN | 108173645 A | 6/2018 |  |
|---|---|---|---|
| CN | 108173645 B | * 2/2021 | ........... G01R 31/308 |
| CN | 117436323 A | 1/2024 |  |

OTHER PUBLICATIONS

Maldini et al. Genetic Algorithm-Based Electomagnetic Fault Inhection 2018 Workshop on Fault Diagnosis and Tolerance in Cryptography, IEEE 2018 (Year: 2018).*

(Continued)

*Primary Examiner* — Rehana Perveen
*Assistant Examiner* — Cuong V Luu
(74) *Attorney, Agent, or Firm* — Westbridge IP LLC

(57) ABSTRACT

Disclosed in the present application is a high-spatial-accuracy electromagnetic fault injection method for a cryptographic chip. According to the method, a spatial position of an electromagnetic probe is adjusted according to a physical structure of a target chip and the characteristic of an integrated circuit, including accurate positioning of three dimensions of X, Y and Z as well as an angle with a surface of the chip, so that electromagnetic fault injection acts on a key area of the chip more accurately, thereby improving the pertinence and efficiency of fault injection.

6 Claims, 4 Drawing Sheets

(56) References Cited

OTHER PUBLICATIONS

Menu et al. Precise Spatio-Temporal Electromagnetic Fault Injections on Data Transfers 2019 Workshop on Fault Diagnosis and Tolerance in Cryptography, IEEE 2019 (Year: 2019).*

First Office Action issued in counterpart Chinese Patent Application No. 202411225116.5, dated Oct. 23, 2024.

* cited by examiner

HIGH-SPATIAL-ACCURACY ELECTROMAGNETIC FAULT INJECTION METHOD FOR CRYPTOGRAPHIC CHIP

CROSS-REFERENCE TO RELATED APPLICATIONS

This application claims priority to Chinese Patent Application No. 202411225116.5, filed on Sep. 3, 2024, the content of which is incorporated herein by reference in its entirety.

TECHNICAL FIELD

The present application relates to the technical fields of integrated circuit safety and electromagnetic fault injection, and in particular to a high-spatial-accuracy electromagnetic fault injection method for a cryptographic chip.

BACKGROUND

With the rapid development of a semiconductor process and an integrated circuit technology, the integration level of an integrated circuit has been continuously increased, and functions have become more complicated. The integrated circuit plays a fundamental and core role in a plurality of key fields, such as electronic products, network communication, medical electronics, aerospace and military. However, this also brings increasing prominent information safety problems. As a key assembly of information safety, a cryptographic chip is responsible for implementing an encryption algorithm, so the cryptographic chip is vulnerable to physical attacks. The protection of the cryptographic chip has become the focus of research.

Tests for the cryptographic chip are mainly divided into two types: a side channel test and a fault injection test. The fault injection test obtains the output of a fault ciphertext by introducing fault disturbance when the encryption algorithm is performed on the chip, so that analysis is performed to obtain a key and other sensitive information. In an existing electromagnetic fault injection (EMFI) method, a spatial positioning test can be performed without touching the chip, but there is a great limitation in the spatial accuracy. The current research still stays in the positioning of a plane sensitive position, and the sensitive position obtained only positioned on the plane is difficult to further improve the effectiveness of injection. Therefore, in the prior art, the difference of a physical structure of a target chip has not been considered, a spatial position of a probe has not been adjusted, and high-spatial-accuracy electromagnetic fault injection cannot be implemented, so that the electromagnetic fault injection test may fail due to the insufficient spatial accuracy, thereby greatly increasing the number of times of later tests and prolonging the test cycle.

At present, there is no effective method to solve the problem.

SUMMARY

In view of the problem that the test effect is limited caused by the fact that the position of fault injection cannot be accurately controlled due to the insufficient spatial accuracy in the current electromagnetic fault injection technology, the present application provides a high-spatial-accuracy electromagnetic fault injection method for a cryptographic chip, including the following steps:

inputting a plaintext into a cryptographic chip to be tested to obtain a first ciphertext output by the cryptographic chip to be tested;

selecting a target bit in the first ciphertext;

determining sensitive position data capable of inverting a value of the target bit, wherein the sensitive position data are three-dimensional coordinates of placing the electromagnetic probe as well as a horizontal angle with the cryptographic chip to be tested when the electromagnetic probe is placed;

setting the electromagnetic probe according to the sensitive position data, transmitting an electromagnetic pulse to the cryptographic chip to be tested, obtaining a second ciphertext output by the cryptographic chip to be tested, and monitoring the value of the target bit;

entering a next step if the value of the target bit is inverted, and re-determining the sensitive position data if the value of the target bit is not inverted;

saving a data vector comprising the first ciphertext and the second ciphertext, changing the plaintext input, selecting a next target bit, repeating all the above operations, and entering a next step if each bit in the second ciphertext has been traversed; and analyzing the saved data vector by a differential fault analysis algorithm and cracking key information of the cryptographic chip to be tested.

The embodiments of the present application have the following technical effects.

Firstly, according to the present application, a spatial position of an electromagnetic probe is adjusted according to a physical structure of a target chip and the characteristic of an integrated circuit, including accurate positioning of three dimensions of X, Y and Z as well as an angle with a surface of the chip, so that electromagnetic fault injection acts on a key area of the chip more accurately, thereby improving the pertinence and effectiveness of fault injection.

Secondly, an electromotive force generated by the injected electromagnetic pulse is adjusted by accurately controlling the position and angle of the electromagnetic probe, and the electromotive force is a key factor affecting the injection effectiveness. According to the present application, the sensitive position capable of increasing the fault injection success rate can be identified, so that the number of times of performing blind tests in the later test is reduced, and the whole test efficiency and accuracy are significantly improved.

Lastly, according to the present application, the key information of the cryptographic chip to be tested is cracked through differential fault analysis (DFA) and by collecting incorrect ciphertexts output by the same key under different plaintext inputs, which is helpful for the cryptographic chip designers to improve protection measures in time for the electromagnetic fault injection and enhance the safety of the chip.

BRIEF DESCRIPTION OF THE DRAWINGS

To more clearly describe the technical solutions of the specific embodiments of the present application or in the prior art, the accompanying drawings required to describe the specific embodiments or the prior art are briefly described below. Apparently, the accompanying drawings described below are some embodiments of the present application. Those of ordinary skill in the art may further obtain other accompanying drawings based on these accompanying drawings without inventive effort.

DETAILED DESCRIPTION OF THE EMBODIMENTS

To make the objective, technical solutions and advantages of the embodiments of the present application clearer, the technical solutions of the present application will be clearly and completely described below. Apparently, the embodiments described are merely some embodiments rather than all embodiments of the present application. Based on the embodiments of the present application, all other embodiments obtained by those of ordinary skill in the art without creative efforts shall fall within the protection scope of the present application.

In the traditional electromagnetic fault injection method, only two-dimensional adjustment in X and Y axes is usually concerned. This method can implement fault injection to a certain extent, but the effectiveness is often limited by the spatial accuracy, which is difficult to achieve a qualitative leap.

To overcome this problem, the present application introduces height adjustment and angle adjustment of the Z axis, thereby implementing the three-dimensional space positioning of the electromagnetic probe and the accurate orientation relative to the cryptographic chip. According to the present application, through the multi-dimensional adjustment, the coupling efficiency between the electromagnetic field and a chip circuit is optimized, and the accuracy and success rate of the fault injection are significantly improved. The comprehensive three-dimensional space adjustment strategy, combined with angle optimization, enables the fault injection technology to act on a target chip more accurately and efficiently, thereby providing a more effective technical means for the safety evaluation of the cryptographic chip and the improvement of the protection measures. By the method of the present application, the electromagnetic fault injection of the cryptographic chip can be implemented with higher accuracy within less test times, thereby greatly improving the efficiency and quality of the safety test.

Embodiment 1

Figure 1:
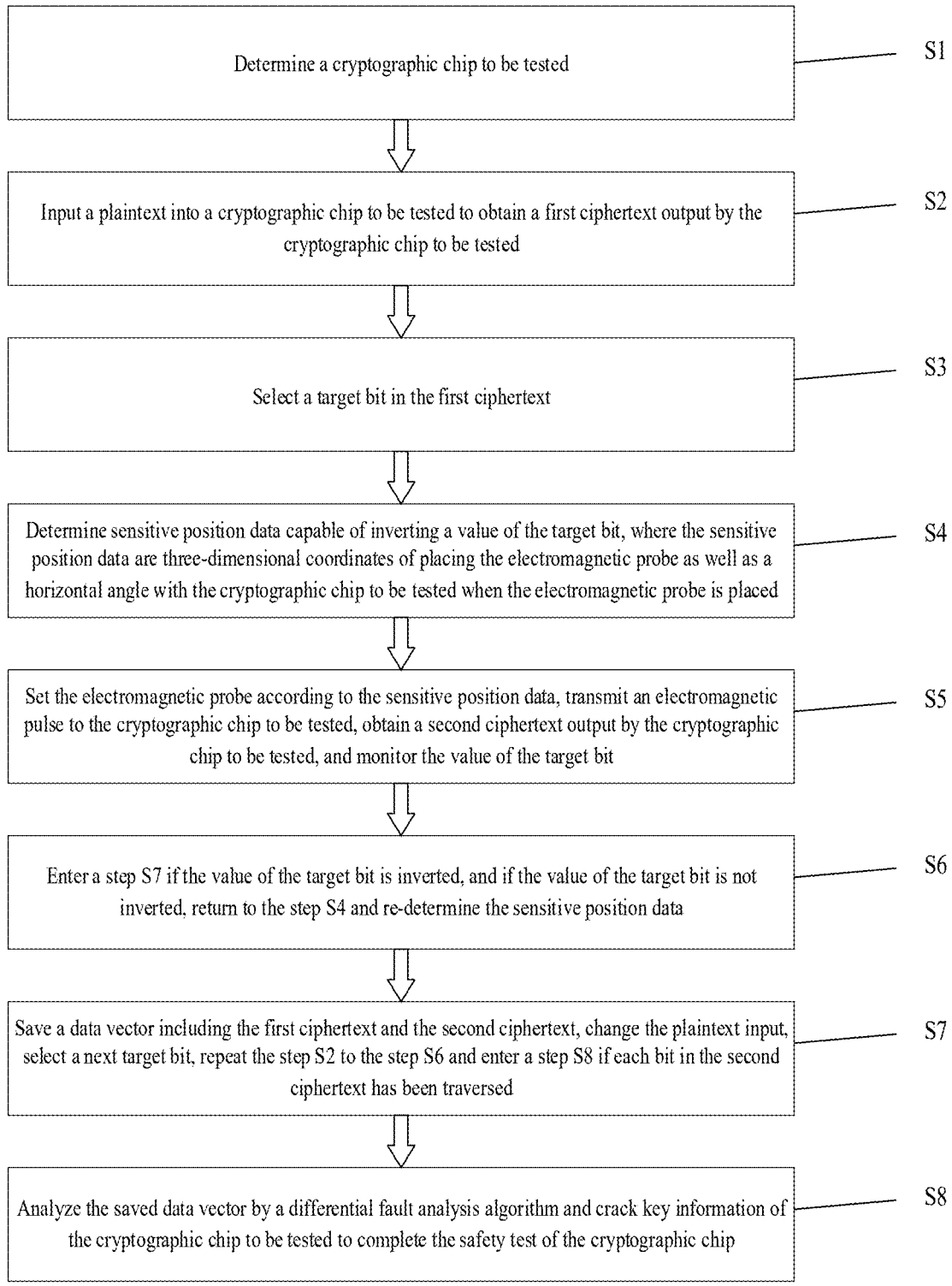
FIG. 1 is a flowchart of a high-spatial-accuracy electromagnetic fault injection method for a cryptographic chip according to an embodiment of the present application.

The present application provides a high-spatial-accuracy electromagnetic fault injection method for a cryptographic chip. FIG. 1 is a flowchart of a high-spatial-accuracy electromagnetic fault injection method for a cryptographic chip according to an embodiment of space present application. Referring to FIG. 1, the method specifically includes:

an electromagnetic fault injection experimental apparatus is prepared, specifically including an upper computer, an electromagnetic pulse generator, an electromagnetic probe, an XYZ-direction three-axis displacement platform and the cryptographic chip to be tested, where the upper computer is configured to control and operate each device in an experimental platform and use a serial port to communicate with the cryptographic chip to be tested, the pulse generator is configured to generate an electromagnetic pulse signal, the electromagnetic probe is configured to generate a high-voltage transient electromagnetic field so as to generate transient induced voltage and current in a target chip, and the XYZ-direction three-axis displacement platform is configured to accurately adjust relative positions of the electromagnetic probe and the target chip.

Before the operation, parameters of the electromagnetic fault injection apparatus can be first set, such as a pulse width and a frequency of the electromagnetic pulse, a stepping speed of a moving platform, a moving step length and fault injection time.

The cryptographic chip to be tested is fixed on the XYZ-direction three-axis displacement platform.

For a smart card chip, a contact pad inside the smart card chip effectively shields most of the magnetic flux, so the back of the smart card is usually upward. For an embedded chip, the electromagnetic field can easily pass through plastic package or epoxy resin package outside, so the front of the embedded chip is usually upward.

S1: the cryptographic chip to be tested is determined. Optionally, the target chip such as the cryptographic chip can encrypt a plaintext input as an output ciphertext by an encryption algorithm.

S2: the plaintext is input into the cryptographic chip to be tested to obtain a first ciphertext output by the cryptographic chip to be tested.

The first ciphertext is a correct ciphertext output by the cryptographic chip to be tested without any attack, which can serve as a reference for subsequently verifying whether the target bit is inverted.

In cryptography, a ciphertext is a series of bits obtained by converting the plaintext by the encryption algorithm, and each bit may be 0 or 1. When the target bit is affected by the fault, the value may be inverted, that is, if the original value is 0, the value may be changed into 1 after fault injection; and if the original value is 1, the value may be changed into 0 after fault injection. By analyzing the inversion of the target bit in a plurality of fault injection examples, a tester can infer some key information in the encryption process, and finally may deduce an encrypted key.

S3: a target bit in the first ciphertext is selected.

S4: sensitive position data capable of inverting a value of the target bit is determined, where the sensitive position data are three-dimensional coordinates of placing the electromagnetic probe as well as a horizontal angle with the cryptographic chip to be tested when the electromagnetic probe is placed.

Figure 2:
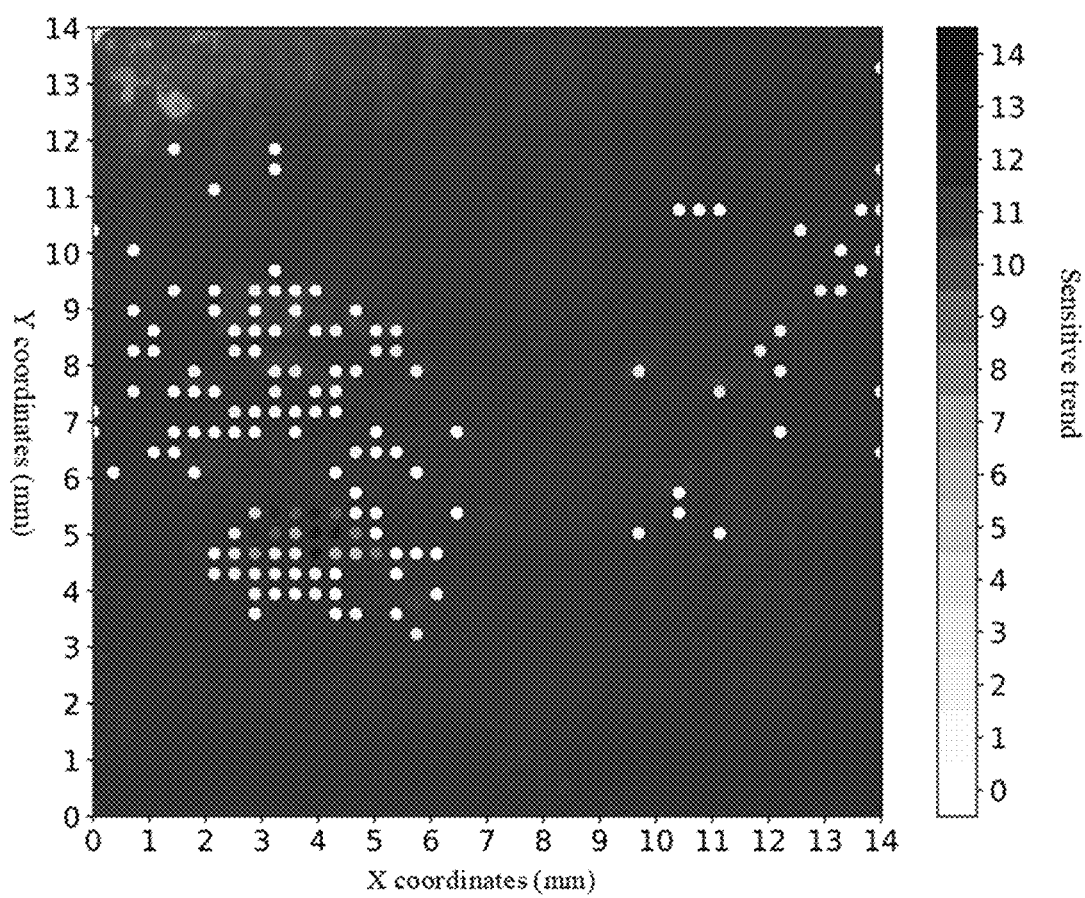
FIG. 2 is a schematic diagram of plane coordinates of a sensitive position of a cryptographic chip according to an embodiment of the present application.

In general: a method for confirming X and Y coordinates of three-dimensional coordinates of placing the electromagnetic probe is as follows: performing gridding division on the cryptographic chip to be tested may be to perform gridding operation set on an SRAM area of a chip to be tested, and sensitive points corresponding to the test on different bytes of the cryptographic chip are represented by manufacturing a sensitive map. Faults are injected at each possible position point on the chip repeatedly. The sensitive points corresponding to the bytes are pointed out according to the fault position and effect drawing. As shown in FIG. 2, the cryptographic chip to be tested can be divided into a plurality of grid areas in millimeters. Dots in the figure represent the plane positions of the found sensitive points that are easily disturbed by the electromagnetic pulse. The darker the color, the more easily disturbed by the electromagnetic pulse.

According to the tested target bytes, the probe is placed at the most sensitive position of the target chip through the XYZ-direction three-axis displacement platform to obtain (X, Y). Specifically, each bit in the ciphertext at each grid is taken as a target to perform the following operations:

the coordinates of the current grid are set as (X, Y), the electromagnetic probe is placed at a position with a height H (H>0) above the grid, the electromagnetic pulse is transmitted to the cryptographic chip to be tested at the same angle, the transmitting process is repeated several times, and the number of times of inversion only occurring on the value of the target bit after each transmission is counted;

the probability $P_1$ of inversion of the value of the target bit is calculated according to the number of times of inversion; and the X and Y values of the coordinates of the current grid are X and Y coordinate values of the sensitive position data of the target bit if the probability $P_1$ is greater than a preset value $P_{10}$, otherwise, the operation of the step S41 to the step S42 is performed on a next grid until the X and Y coordinate values of the sensitive position data corresponding to each bit in the ciphertext are determined.

A method for confirming the Z coordinates of the three-dimensional coordinates of placing the electromagnetic probe is as follows:

a distance between the electromagnetic probe and the cryptographic chip to be tested is adjusted at the X and Y coordinates of the sensitive position corresponding to the target bit, the electromagnetic pulse is transmitted at the same angle several times, and the number of times of inversion only occurring on the value of the target bit after each transmission is counted; and the electromagnetic probe moves relative to the cryptographic chip to be tested, and a spatial position over the (X, Y) coordinates is traversed from far to near.

The moving mode may adopt an arithmetic progression mode, and a round of test is performed every fixed distance.

The probability $P_2$ of inversion of the value of the target bit is calculated according to the number of times of inversion; and the Z value of the coordinates of the current grid is a Z coordinate value of the sensitive position data of the target bit if the probability $P_2$ is greater than a preset value $P_{20}$, otherwise, the operation of the step S44 to the step S45 is performed on a next grid until the Z coordinate value of the sensitive position data corresponding to each bit in the ciphertext is determined.

A method for confirming an angle with the cryptographic chip to be tested when the electromagnetic probe is placed is as follows:

the angle between the electromagnetic probe and the cryptographic chip to be tested is adjusted at the X, Y and Z coordinates corresponding to the target bit, the electromagnetic pulse is transmitted several times, and the number of times of inversion only occurring on the value of the target bit after each transmission is counted; and the angle between the electromagnetic probe and the cryptographic chip to be tested is adjusted as follows: the angle at which the electromagnetic pulse is transmitted to the cryptographic chip to be tested is capable of being traversed by taking the (X, Y, Z) coordinates as the center of sphere.

The moving mode may adopt an arithmetic progression mode, and a round of test is performed every fixed angle.

The probability $P_3$ of inversion of the value of the target bit is calculated according to the number of times of inversion; and the current angle between the electromagnetic probe and the cryptographic chip to be tested is an angle value of the sensitive position data of the target bit if the probability $P_3$ is greater than a preset value $P_{30}$, otherwise, the operation of the step S47 to the step S48 on a next grid is performed until the angle value of the sensitive position data corresponding to each bit in the ciphertext is determined.

When the injected electromagnetic pulse inverts the value of the target bit, it can be considered that the sensitive position of the target bit has been found. To improve the test accuracy, multiple test operations can be selected. When the probability that the value of the target bit is inverted by the injected electromagnetic pulse reaches a certain value, it is considered that a sensitive position has been found.

In the differential fault analysis (DFA) process, with the gradual and accurate conformation of the sensitive position information of the cryptographic chip, the condition that the target bit is inverted becomes more favorable. This means that when the electromagnetic probe is adjusted to be closer to the optimal XYZ spatial position and angle, the inversion probability of the target bit ($P_1$, $P_2$, $P_3$) will be increased sequentially, reflecting the improvement of the fault injection efficiency. Correspondingly, to identify the truly effective fault injection point, the set thresholds ($P_{10}$, $P_{20}$, $P_{30}$) will be increased accordingly, ensuring that the position is considered to be sensitive only when the fault injection reaches a high success rate. This strategy ensures that with the continuous optimization of the probe position and angle, the accurate position capable of causing the inversion of the target bit can be identified more reliably, thereby improving the accuracy and efficiency of the differential fault analysis.

From the principle analysis, the step S4 can be understood as follows:

an included angle $\theta_1$ between the surface of the coil and a magnetic field line as well as a distance $Z_1$ from the center of the coil to the point on the axis are determined preliminarily by a successive approximation method. A reference pulse amplitude is set as $V_1$, the probe is gradually approached to the cryptographic chip to be tested from a far distance, and the injection effect is monitored at the same time. When the target bit is observed to be inverted, it can be considered that an appropriate distance $Z_1$ has been found, and the direct contact between the probe and the target is avoided at the same time, thereby avoiding short circuit or other physical damage. The direction of the electromagnetic field has a significant influence on the fault injection. The direction of the probe is adjusted to find an optimal coupling angle $\theta_1$.

Figure 3:
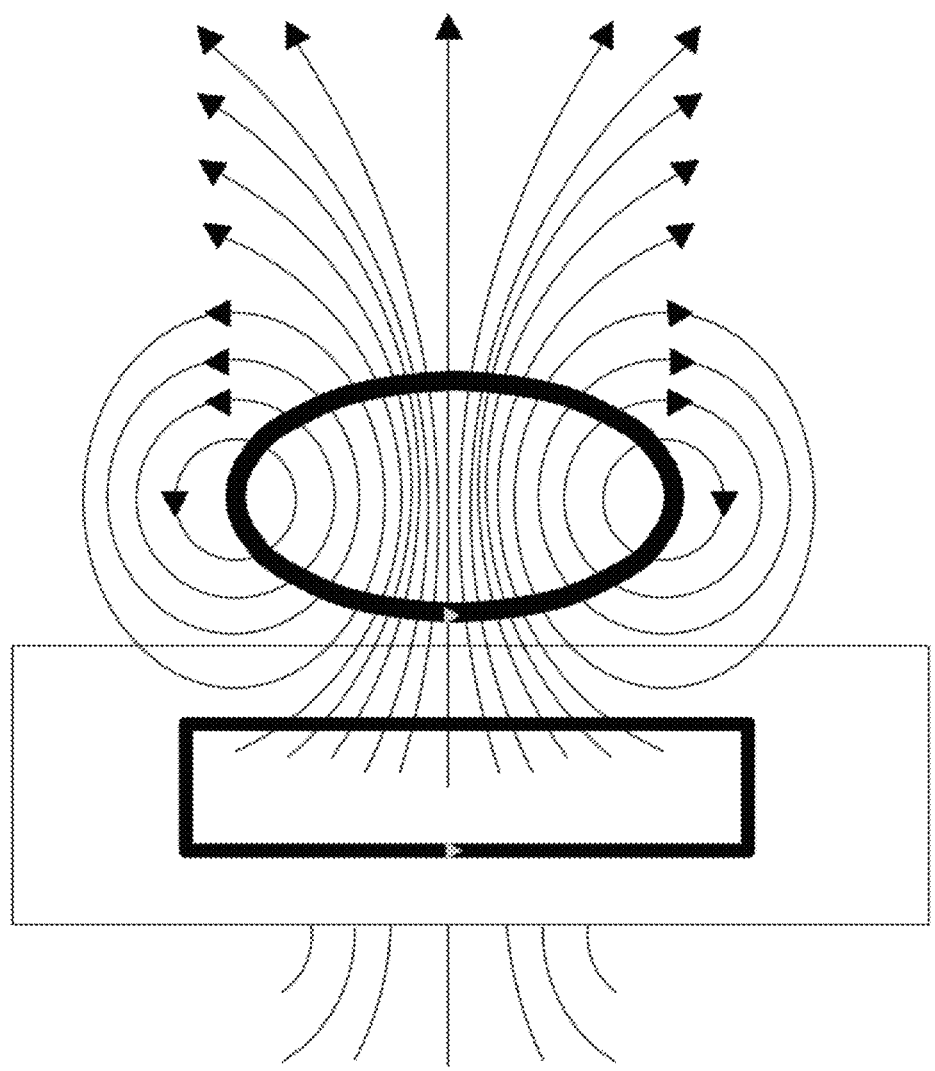
FIG. 3 is a schematic diagram of a relationship between a coil and an electromagnetic field according to an embodiment of the present application.

As shown in FIG. 3, the number of turns of the coil is set as N, the surface area of the coil is set as S, the current flowing through the coil is set as $I_1$ when the pulse amplitude is $V_1$, the induction intensity of the magnetic field generated by the coil is $B_1$, the included angle between the surface of the coil and the magnetic field line is $\theta_1$, then the magnetic flux $\varphi_{B1}$ of the coil is expressed as:

$$\varphi_{B1} = B_1 S \cos\theta_1;$$

The magnetic conductivity of a medium in the coil is set as $\mu_r$, the radius of the coil is set as r, and the distance from the circle center of the coil to the point on the axis is set as $Z_1$, then the magnetic induction intensity of a point on the axis of the coil may be expressed as:

$$B_1 = \frac{\mu_r I_1 r^2}{2(r^2 + z_1^2)^{\frac{3}{2}}};$$

When the coil is close to the target chip, according to the law of electromagnetic induction, an induced electromotive force generated in the target chip may be expressed as:

$$\varepsilon = N\frac{d\varphi_{B1}}{dt} = N\frac{d(B_1 S \cos\theta_1)}{dt};$$

The above formula is brought to obtain that when the pulse amplitude is $V_1$, the induced electromotive force generated by the target chip is:

$$\varepsilon = N\frac{d(B_1 S \cos\theta_1)}{dt} = NS \cos\theta_1 \frac{dB_1}{dt} = NS \cos\theta_1 \frac{\mu_r r^2}{2(r^2 + z_1^2)^{\frac{3}{2}}} \frac{dI_1}{dt};$$

For different injection intensities, the position of the electromagnetic probe is adjusted so as to perform high-spatial-accuracy accurate control on the electromagnetic fault injection. When the pulse amplitude is $V_2$, the time-varying rate of the current flowing through the coil becomes $$\frac{dI_2}{dt}.$$

To control the induced electromotive force F generated by the target chip to perform accurate fault injection on the target byte, it is necessary to respectively adjust the included angle $\theta_1$ between the surface of the coil and the magnetic field line as well as the distance $Z_1$ from the center of the coil to the point on the axis as $\theta_2$ and $Z_2$, and at this time, the induced electromotive force is $$\varepsilon = NS \cos\theta_2 \frac{\mu_r r^2}{2(r^2 + z_2^2)^{\frac{3}{2}}} \frac{dI_2}{dt}.$$

The spatial position (X,Y,$Z_2$) of the electromagnetic probe and the included angle $\theta_2$ can be obtained from the above. It can also be seen that the intensity of the induced electromotive force can be further changed by adjusting the spatial position of the electromagnetic probe, that is, the accurate positioning of Z and the angle with the surface of the chip, so that the electromagnetic fault injection acts on the key area of the chip more accurately, thereby improving the pertinence and effectiveness of fault injection.

S5: the electromagnetic probe is set according to the sensitive position data, an electromagnetic pulse is transmitted to the cryptographic chip to be tested, a second ciphertext output by the cryptographic chip to be tested is obtained, and the value of the target bit is monitored.

S6: step S7 is entered if the value of the target bit is inverted, and if the value of the target bit is not inverted, the step S4 is returned and the sensitive position data is re-determined.

S7: a data vector including the first ciphertext and the second ciphertext is saved, the plaintext input is changed, a next target bit is selected, the step S2 to the step S6 are repeated, and a S8 is entered if each bit in the second ciphertext has been traversed.

When the target bit is inverted, the test of one cycle is completed, and the chip is initialized and the apparatus is reset again.

The purpose of changing the plaintext is to increase the diversity of the data and improve the accuracy of differential analysis. Whether to change the plaintext can be determined according to requirements. Meanwhile, the changed plaintext can adopt a certain rule, for example, only one bit or some information is different, and also can reduce the data amount of later analysis and improve the efficiency.

It is worth emphasizing that under normal circumstances, electromagnetic pulse interference will enable the cryptographic chip to generate non-unique interference, and the output result is not necessarily what we want. To improve the accuracy of later differential analysis and reduce the calculation data amount, in the present application, the inversion of single target bit is monitored, and when non-single bit inversion or other interference occurs, it is recorded as noneffective interference. In other embodiments, other monitoring standards can also be selected.

S8: the saved data vector is analyzed by a differential fault analysis algorithm and key information of the cryptographic chip to be tested is cracked.

Specifically, a group of data vectors including a first ciphertext and a second ciphertext are obtained; a difference between the first ciphertext and the second ciphertext in each group of data vectors to obtain a candidate fault set; and intersection operation is performed on the candidate fault set to obtain a key of the cryptographic chip to be tested.

A differential fault analysis (DFA) algorithm, as a mature technology, has been widely applied to the safety analysis and key cracking of the cryptographic chip. DFA can effectively infer an encrypted key by performing deep analysis on the ciphertext difference caused by a minor fault introduced in the encryption process. This technology uses the characteristic of significant change of the ciphertext caused by slight change of the plaintext in the encryption algorithm to gradually reveal the key information by comparing an output difference between a fault and a normal execution. Due to the extensive application and deep research of the DFA algorithm in the field of cryptanalysis, the theory and the practical method are quite mature, so the present application does not explain the DFA algorithm in detail, but emphasizes how to enhance the effectiveness and accuracy of the DFA by the high-spatial-accuracy electromagnetic fault injection method.

The effectiveness of the above method can be verified, that is, the accuracy of the DFA is described by comparing the key obtained by cracking and the input key. The ratio of the number of times n of effective fault injections to the number of times N of all fault injections is defined as an effective fault injection success rate ISR(f) of the cryptographic chip:

$$ISR(f) = \frac{n}{N};$$

The higher ISR(f), the more effective the method. The high-spatial-accuracy electromagnetic fault injection method is evaluated in combination with the effect of DFA and the success rate of the effective fault injection.

In view of an electromagnetic fault injection test for a cryptographic chip, the present application provides a high-spatial-accuracy electromagnetic fault injection method for a cryptographic chip. According to the method, when the cryptographic chip is subjected to electromagnetic fault injection, the spatial position of the electromagnetic probe can be controlled more accurately, the analysis efficiency and effect of DFA analysis can be improved, and the effective injection success rate can be increased. Considering a coupling mechanism between a probe generating the electromagnetic pulse and a target circuit, the electromagnetic pulse fault has local effect, the spatial position of the electromagnetic probe is adjusted, and a sensitive point (X, Y) of a target byte is found. Further considering different electromagnetic pulse intensities, the spatial position of the electromagnetic probe is further adjusted. The cryptographic chip is subjected to the electromagnetic pulse fault injection many times, so that the fault injection of the target bit inversion will be regarded as effective injection, incorrect ciphertexts output by the same key under different plaintext inputs are collected, the key information of the cryptographic chip is cracked by differential fault analysis (DFA), and the high-spatial-accuracy electromagnetic fault injection method is evaluated in combination of the effect of DFA and the success rate of the effective fault injection. This technology is helpful for cryptographic chip designers to improve protection measures in time and enhance the safety of the chip in view of the electromagnetic fault injection.

Embodiment 2

Figure 4:
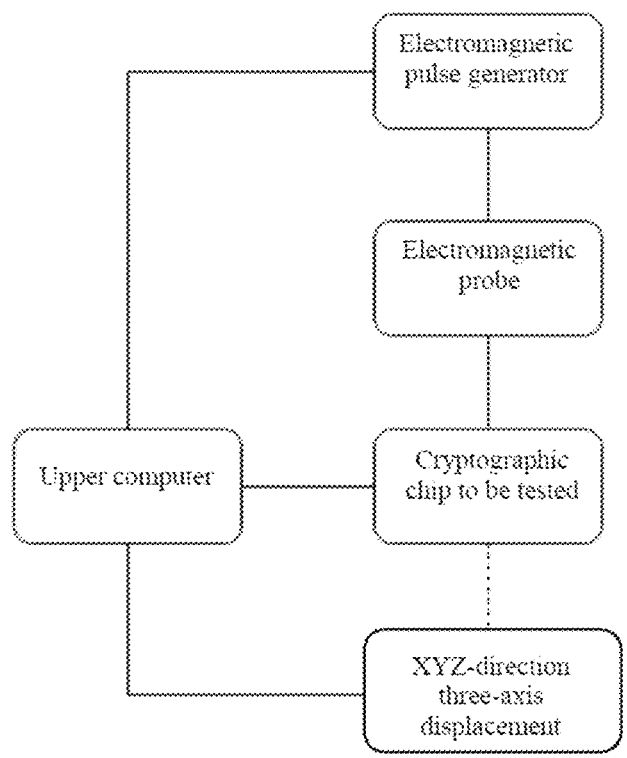
FIG. 4 is a structural schematic diagram of a high-spatial-accuracy electromagnetic fault injection system for a cryptographic chip according to an embodiment of the present application.

As shown in FIG. 4, the present application further provides a high-spatial-accuracy electromagnetic fault injection system for a cryptographic chip, using the high-spatial-accuracy electromagnetic fault injection method for the cryptographic chip according to any one of Embodiment 1, and including:

- an upper computer, configured to control and operate each device in an experimental platform and use a serial port to communicate with the cryptographic chip to be tested;
- an electromagnetic pulse generator, connected to the upper computer and configured to generate an electromagnetic pulse signal;
- an electromagnetic probe, connected to the electromagnetic pulse generator and the cryptographic chip to be tested and configured to generate a high-voltage transient electromagnetic field so as to generate transient induced voltage and current in the cryptographic chip to be tested; and
- an XYZ-direction three-axis displacement platform, connected to the upper computer and configured to accurately adjust relative positions of the electromagnetic probe and the target chip. The stepping speed and the moving step length of the XYZ-direction three-axis displacement platform are set according to the size of the cryptographic chip to be tested. The larger the size of the cryptographic chip to be tested, the lower the stepping rate of the XYZ-direction three-axis displacement platform, and the smaller the moving step length.

Embodiment 3

A computer-readable storage medium includes a computer program instruction. The computer program instruction enables the computer to perform the steps of the high-spatial-accuracy electromagnetic fault injection method for the cryptographic chip according to any one of Embodiment 1.

The computer-readable storage medium may adopt any combination of one or any combination of more readable mediums. The readable medium may be a readable signal medium or a readable storage medium. The readable storage medium, for example, may include, but is not limited to an electronic, magnetic, optical, electromagnetic, infrared, or semiconductor system, apparatus or device, or any combination of the above. More specific examples (a non-exhaustive list) of the readable storage medium may include: an electrically connected and portable disc with one or more wires, a hard disc, a random access memory (RAM), a read-only memory (ROM), an erasable programmable read-only memory (EPROM) or a flash memory, an optical fiber, a compact disc read-only memory (CD-ROM), an optical storage device, and a magnetic storage device that are each electrically connected through one or more wires, or any suitable combination of the above.

It should be noted that the terms used in the present application are merely for describing specific embodiments, rather than limiting the embodiments of the present application. As shown in the specification of the present application, unless the context clearly suggests an exception, the words such as "a", "an", "one" and/or "the" do not refer to the singular, or may include the plural. The terms "including", "comprising" or other variations thereof are intended to cover non-exclusive inclusion, so that a process, method or device including a series of elements not only includes those elements, but also includes other elements not explicitly listed, or further includes elements inherent to such process, method or device. In the absence of more limitations, an element defined by "include a . . . " does not exclude other same elements existing in the process, method or device including the element.

It should be further noted that orientations or positional relationships indicated by terms, such as "center", "upper", "lower", "left", "right", "vertical", "horizontal", "inner", "outer", "front" and "rear" are based on orientations or positional relationships shown in the drawings, are to facilitate the description of the present application and simplify the description merely, do not indicate or imply that the referred apparatuses or elements must have specific orientations and are constructed and operated in the specific orientations and thus should not be construed to limit the present application. Unless otherwise clearly specified and defined, the terms "mount", "interconnect" and "connect" should be understood in their broad sense. For example, the terms may be "fixedly connect", "detachably connect" or "integrally connect"; "mechanically connect" and "electrically connect"; or "directly interconnect", "indirectly interconnect through an intermediate" or "the communication between the interiors of two elements". For those of ordinary skill in the art, the specific meanings of the above terms in the present application may be understood according to specific situations.

Finally, it should be noted that: the above embodiments are merely used for illustrating the technical solutions of the present application, but do not limit them; although the present application has been described in detail with reference to the foregoing examples, those of ordinary skills in the art should understand that: the technical solutions recorded in the foregoing embodiments may still be modified, or some of the technical features therein may be equivalently substituted; however, these modifications or substitutions do not separate the essence of the corresponding technical solutions from the spirit and scope of the technical solutions of the embodiments of the present application.

What is claimed is:

1. A high-spatial-accuracy electromagnetic fault injection method for a cryptographic chip, being used for a safety test of the cryptographic chip, comprising the following steps:

inputting a plaintext into a cryptographic chip to be tested to obtain a first ciphertext output by the cryptographic chip to be tested;

selecting a target bit in the first ciphertext;

determining sensitive position data capable of inverting a value of the target bit, wherein the sensitive position data are three-dimensional coordinates of placing the electromagnetic probe as well as a horizontal angle with the cryptographic chip to be tested when the electromagnetic probe is placed;

setting the electromagnetic probe according to the sensitive position data, transmitting an electromagnetic pulse to the cryptographic chip to be tested, obtaining a second ciphertext output by the cryptographic chip to be tested, and monitoring the value of the target bit;

entering a next step if the value of the target bit is inverted, and re-determining the sensitive position data if the value of the target bit is not inverted;

saving a data vector comprising the first ciphertext and the second ciphertext, changing the plaintext input, selecting a next target bit, repeating all the above operations, and entering a next step if each bit in the second ciphertext has been traversed; and analyzing the saved data vector by a differential fault analysis algorithm and cracking key information of the cryptographic chip to be tested to complete the safety test of the cryptographic chip;

wherein before the step of inputting the plaintext into the cryptographic chip to be tested to obtain the first ciphertext output by the cryptographic chip to be tested, the method further comprises:

preparing an electromagnetic fault injection experimental apparatus specifically comprising an upper computer, an electromagnetic pulse generator, an electromagnetic probe, an XYZ-direction three-axis displacement platform and the cryptographic chip to be tested, wherein the upper computer is configured to control and operate each device in the electromagnetic fault injection experimental apparatus and use a serial port to communicate with the cryptographic chip to be tested, the pulse generator is configured to generate an electromagnetic pulse signal, the electromagnetic probe is configured to generate a high-voltage transient electromagnetic field, and the XYZ-direction three-axis displacement platform is configured to adjust relative positions of the electromagnetic probe and the cryptographic chip to be tested; and fixing the cryptographic chip to be tested on the XYZ-direction three-axis displacement platform;

wherein a method for confirming X and Y coordinates of the three-dimensional coordinates of placing the electromagnetic probe comprises:

performing gridding division on the cryptographic chip to be tested, and taking each bit in the ciphertext at each grid as a target to perform the following operations:

setting the coordinates of the current grid as (X, Y), placing the electromagnetic probe at a position with a height H (H>0) above the grid, transmitting the electromagnetic pulse to the cryptographic chip to be tested at the same angle, repeating the transmitting process several times, and counting the number of times of inversion only occurring on the value of the target bit after each transmission;

calculating the probability $P_1$ of inversion of the value of the target bit according to the number of times of inversion; and determining that the X and Y values of the coordinates of the current grid are X and Y coordinate values of the sensitive position data of the target bit if the probability $P_1$ is greater than a preset value $P_{10}$, otherwise, performing the operation of the two steps of setting the coordinates of the current grid and calculating the probability $P_1$ on a next grid until determining the X and Y coordinate values of the sensitive position data corresponding to each bit in the ciphertext.

2. The high-spatial-accuracy electromagnetic fault injection method for the cryptographic chip according to claim 1, wherein a method for confirming Z coordinates of the three-dimensional coordinates of placing the electromagnetic probe comprises:

adjusting a distance between the electromagnetic probe and the cryptographic chip to be tested at the X and Y coordinates of the sensitive position corresponding to the target bit, transmitting the electromagnetic pulse at the same angle several times, and counting the number of times of inversion only occurring on the value of the target bit after each transmission;

calculating the probability $P_2$ of inversion of the value of the target bit according to the number of times of inversion; and determining that the Z value of the coordinates of the current grid is a Z coordinate value of the sensitive position data of the target bit if the probability $P_2$ is greater than a preset value $P_{20}$, otherwise, performing the operation of the first two steps on a next grid until determining the Z coordinate value of the sensitive position data corresponding to each bit in the ciphertext.

3. The high-spatial-accuracy electromagnetic fault injection method for the cryptographic chip according to claim 2, wherein a method for confirming the angle with the cryptographic chip to be tested when the electromagnetic probe is placed comprises:

adjusting the angle between the electromagnetic probe and the cryptographic chip to be tested at the X, Y and Z coordinates corresponding to the target bit, transmitting the electromagnetic pulse several times, and counting the number of times of inversion only occurring on the value of the target bit after each transmission;

calculating the probability $P_3$ of inversion of the value of the target bit according to the number of times of inversion; and determining that the current angle between the electromagnetic probe and the cryptographic chip to be tested is an angle value of the sensitive position data of the target bit if the probability $P_3$ is greater than a preset value $P_{30}$, otherwise, performing the operation of the first two steps on a next grid until determining the angle value of the sensitive position data corresponding to each bit in the ciphertext.

4. The high-spatial-accuracy electromagnetic fault injection method for a cryptographic chip according to claim 2, wherein adjusting the distance between the electromagnetic probe and the cryptographic chip to be tested is as follows: the electromagnetic probe moves relative to the cryptographic chip to be tested, and a spatial position over the (X, Y) coordinates is traversed from far to near.

5. The high-spatial-accuracy electromagnetic fault injection method for the cryptographic chip according to claim 3, wherein adjusting the angle between the electromagnetic probe and the cryptographic chip to be tested is as follows: the angle at which the electromagnetic pulse is transmitted to the cryptographic chip to be tested is capable of being traversed by taking the (X, Y, Z) coordinates as a center of sphere.

6. The high-spatial-accuracy electromagnetic fault injection method for the cryptographic chip according to claim 1, wherein the analyzing the saved data vector by the differential fault analysis algorithm and cracking key information of the cryptographic chip to be tested to complete the safety test of the cryptographic chip specifically comprises:
   obtaining a group of data vectors comprising a first ciphertext and a second ciphertext;
   calculating a difference between the first ciphertext and the second ciphertext in each group of data vectors to obtain a candidate fault set; and
   performing intersection operation on the candidate fault set to obtain a key of the cryptographic chip to be tested.

\* \* \* \* \*